United States Patent
Gott

(10) Patent No.: US 6,175,310 B1
(45) Date of Patent: Jan. 16, 2001

(54) LEAK DETECTION TAPE

(76) Inventor: Richard J. Gott, 120 E. Quail Trail, Lewes, DE (US) 19958

(*) Notice: Under 35 U.S.C. 154(b), the term of this patent shall be extended for 0 days.

(21) Appl. No.: 09/307,564

(22) Filed: May 10, 1999

(51) Int. Cl.⁷ .................................................. G08B 21/00
(52) U.S. Cl. .......................... 340/605; 340/604; 73/40; 604/361
(58) Field of Search .................... 340/604, 605, 340/603, 618, 620; 73/40; 604/361

(56) References Cited

U.S. PATENT DOCUMENTS

| | | |
|---|---|---|
| 2,460,215 * | 1/1949 | Chase . |
| 3,882,476 * | 5/1975 | Lofgren ................ 340/604 |
| 4,297,686 * | 10/1981 | Tom ..................... 340/604 |
| 4,342,988 * | 8/1982 | Thompson et al. ........ 340/679 |
| 4,502,044 | 2/1985 | Farris et al. . |
| 4,695,787 | 9/1987 | Billet et al. . |
| 4,843,305 | 6/1989 | Akiba . |
| 4,864,847 * | 9/1989 | Anderson et al. ......... 73/40.7 |
| 4,896,527 | 1/1990 | Akiba . |
| 5,081,422 | 1/1992 | Shih . |
| 5,341,128 | 8/1994 | Keyser et al. . |
| 5,557,263 | 9/1996 | Fisher et al. . |
| 5,648,724 | 7/1997 | Yankielun et al. . |

* cited by examiner

*Primary Examiner*—Julie Lieu
(74) *Attorney, Agent, or Firm*—Jones, Tullar & Cooper PC

(57) ABSTRACT

An elongated, flexible, flat conductive tape can be applied to any surface to be monitored for water or other liquid leaks, and electrically connected to any suitable type of conventional electrically operated leak detector. A pair of parallel spaced conductors is disposed on one side of the tape that run longitudinally along the length thereof. The conductors are spaced from one another by a small distance to insure that only a small quantity of water or other conductive liquid is necessary to bridge the gap between the conductors, and create an electrical short circuit or substantial impedance reduction between the two. In addition, the conductors are preferably as flat as possible to insure that liquid can freely flow transversely across them without being impeded thereby. Both of these features insure that the detector tape can sense even very small quantities of liquid, thereby generating an early warning of a leak condition before extensive damage results. A liquid responsive visible indication is also provided on the tape to identify the location along the tape where water or other leaking liquid has come in contact therewith, and eliminates the need for using an expensive sensing device to locate the source of a leak.

20 Claims, 5 Drawing Sheets

LEAK DETECTION TAPE

BACKGROUND OF THE INVENTION

1. Field of the Invention

The present invention relates in general to an elongated flexible tape having flat, spaced conductors for detecting liquid leaks, and a method for using the same.

2. Description of the Prior Art

Water and other liquid leaks have long been a problem to homeowners. For example, many homes have air conditioning units with air handlers that are located in the home's attic. These units include evaporators that generate large quantities of condensation that must be collected, and removed through a small drain pipe. It is quite common for the drain pipes to become clogged, and cause the condensation to back up and overflow onto the floor of the attic. Since the residents of the home typically do not check the condition of the unit, the overflowing condensate is usually not detected until it does substantial, costly damage to the ceilings of the rooms below. Hot water heaters are another example of devices that are prone to leak, but which leaks typically go unnoticed until substantial water damage has been done. Likewise, leaky basements and roofs are also apt to go unnoticed until substantial damage has been done to the floor, roof, furnishings and other items in the house.

To address this problem, numerous leak detection systems and methods have been proposed. For example, many electrically operated leak detection devices are available that sense the presence of water or liquid by detecting a change in electrical resistance or impedance between two or more conductors that are exposed to the liquid. While these devices generally work well, they suffer from a number of limitations that inhibit their use in certain applications. For example, in circumstances where it is desirous to monitor a large area, such as a roof or a perimeter of a basement, present systems require the use of time domain reflectometry (TDR), or some other technique, to detect the location along the pair of conductors in the monitored area where a leak occurs. This is because a simple short circuit detection circuit is not capable of detecting the location along a pair of conductors where a short circuit created by water or other conductive liquid bridging the conductors occurs. TDR works by sending a signal along the conductors and detecting the reflection of the signal that is generated at the point where an impedance change occurs between the conductors. Through phase analysis of the reflected signal, the distance along the conductor where a conductive liquid that is present can be determined. While TDR based systems work well, they are much more costly than simple short circuit detectors.

Another problem with previous electrically operated leak detection systems is that they are typically only effective in sensing fairly large quantities of water or other liquid. This is because they employ spaced apart conductors that are too thick, and essentially act as a dam to small quantities of water that prevent the water from traveling past a first conductor into contact with a second conductor, and thereby triggering the leak detector. While this problem may not be a concern in applications where only large quantities of leaking liquid need to be detected, it is a notable concern in numerous other applications, including those discussed previously where water leaking from evaporation units, hot water heaters, toilets and other fixtures, basements and roofs, is to be detected. In these applications, it is imperative that any water leakage be detected as soon as possible to minimize the likelihood that serious water damage will occur. It is therefore desirous that even a few drops of water be detected by the leak detection system so that an individual will be given the earliest warring possible that a leakage problem has developed.

SUMMARY OF THE INVENTION

The present invention overcomes the aforementioned limitations of previous leak detection systems through provision of a flexible, flat self-adhesive conductive tape that can be easily applied to any surface to be monitored for water or other liquid leaks, and connected to any suitable type of conventional electrically operated leak detector. First and second spaced parallel conductors are disposed on a top surface of the tape that run longitudinally along the length thereof. The conductors are spaced from one another by a small distance to insure that only a small quantity of water or other conductive liquid is necessary to bridge the gap between the conductors, and create an electrical short circuit or substantial impedance or resistance reduction between the two. In addition, the conductors and the tape are preferably as flat as possible to insure that liquid can freely flow transversely across them without being impeded thereby. Both of these features of the invention combine to insure that the detector tape can be used in combination with the leak detector to sense even very small quantities of liquid, and thereby generate an early warning of a leak condition before extensive damage results.

Another notable feature of the invention is the provision of visible indicating means on the tape which is used to identify the location along the tape where water or other leaking liquid has come in contact therewith. The indicating means may comprise a surface on the tape that changes color or stains when contacted with water, or may be a pattern of water soluble markings that smear or run when contacted wit water. This is advantageous for a number of reasons. First, it enables one or more long runs of tape to be used with a single simple detector for monitoring one or more large areas, such as the roof and basement of a house, without requiring use of an expensive TDR sensing device to locate the source of a leak. Second, the indicating means makes it easy to quickly spot the source of one or more leaks, regardless of their size. In addition, the liquid responsive indicating means acts as a telltale to mark areas along the detection tape where leaks may have occurred for a brief period of time, such as during a heavy rain shower, but have gone unnoticed because the residence's occupants were not home at the time of the leak to observe the alarm condition. While circuitry can obviously be built into a leak detection system that keeps records of past alarm conditions, the use of the visible indicating means eliminates the need for such circuitry, thus once again enabling a simple, inexpensive short circuit detector to be employed with the detection tape.

BRIEF DESCRIPTION OF THE DRAWINGS

The foregoing and additional features and advantages of the present invention will become apparent from the following detailed description of a preferred embodiment thereof, taken in conjunction with the accompanying drawings, in which.

DETAILED DESCRIPTION OF A PREFERRED EMBODIMENT

Figure 1:
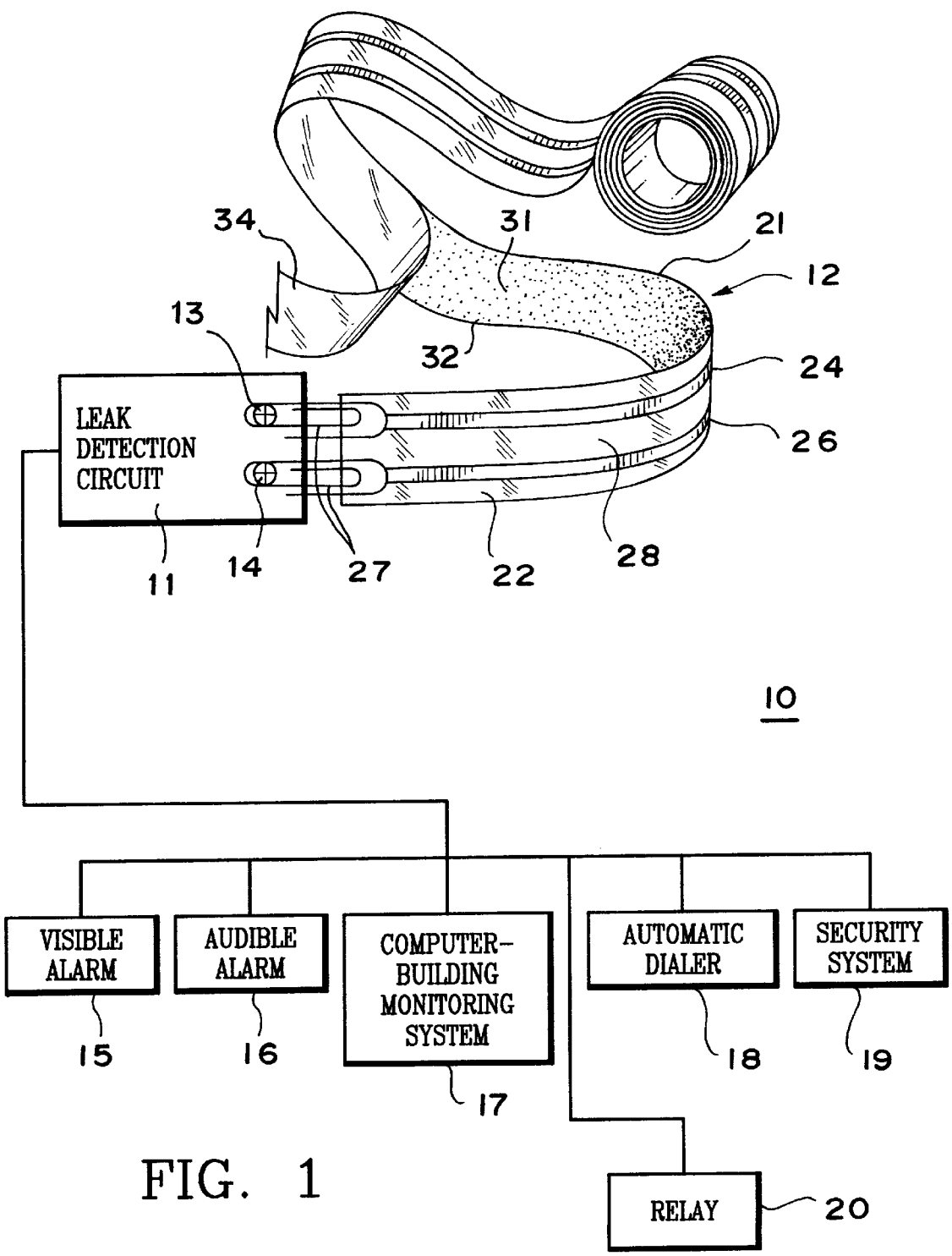
FIG. 1 is an illustration of a leak detection system which employs a leak detection tape constructed in accordance with a preferred embodiment of the present invention.

With reference to FIG. 1, a leak detection system 10 is illustrated that can be employed for detecting water and other liquid leaks, condensation and moisture. The system 10 includes two man elements, an electrically operated leak detection circuit or device 11 and a leak detection tape 12 constructed in accordance with the preferred embodiment of the present invention. The leak detection device 11 can be any conventional device of this nature, including, but not limited to, devices employing circuits that detect impedance changes (i.e., reductions in resistance) resulting from the presence of water or other conductive liquid between two electrodes. First and second electrodes or terminals 13 and 14 are thus provided on the device 11 for connecting it to the leak detection tape 12. The detection device 11 is interfaced to any suitable indicator or communications device for indicating when a leak has been detected. Examples of these types of devices are illustrated in FIG. 1, and include a visible alarm 15, an audible alarm 16, a building monitoring system computer 17, an automatic dialer 18, and an existing security system 19. The detection circuit 11 may also be interfaced to a relay or switch 20 for turning off the water supply of a leaking device. The relay can also cut off the power supply or control voltage to the leaking device, i.e.: A/C's and humidifiers that have no water supply.

The leak detection tape 12 includes a flexible substrate 21, on a top surface 22 of which are disposed, first and second spaced parallel conductors 24 and 26. The electrodes 13 and 14 on the detection device 11 are electrically connected to the conductors 24 and 26 by any suitable means, such as a pair of paper clips 27 as illustrated. Other suitable connection means include clip leads, soldering, taping, wires, etc.

The substrate 21 can be formed from any suitable flexible, electrically insulating material, such as plastic, rubber, fabric, paper, insulation coated foil, etc. Preferably, the substrate 21 is made as thin as possible so that it will not impede the flow of small quantities, e.g., droplets, of water or other liquid across its top surface 22. More specifically, the substrate 21 should be no thicker than 20 mils, but is preferably much thinner. It is also preferable that the material for the substrate 21 be absorbent to enhance the tape's moisture detection sensitivity.

The conductors 24 and 26 are also preferably as flat as possible, again to avoid impeding the flow of small quantities or droplets of water transversely across the conductors 24 and 26. To this end, the preferable ways of forming the conductors 24 and 26 on the substrate 21 include numerous material deposition techniques or processes including etching, photolithographic techniques, plasma spraying, electrostatic adhesive spray painting, painting or brushing with conductive ink, paint or graphite, and electroplating. In addition, an adhesive or glue can be used to attach thin conductive foil strips to the substrate 21. Regardless of the technique employed, it is preferable that the vertical thickness of the conductors 24 and 26 not exceed about 20 mils so that even single droplets of water can flow freely across them.

Figure 2A:
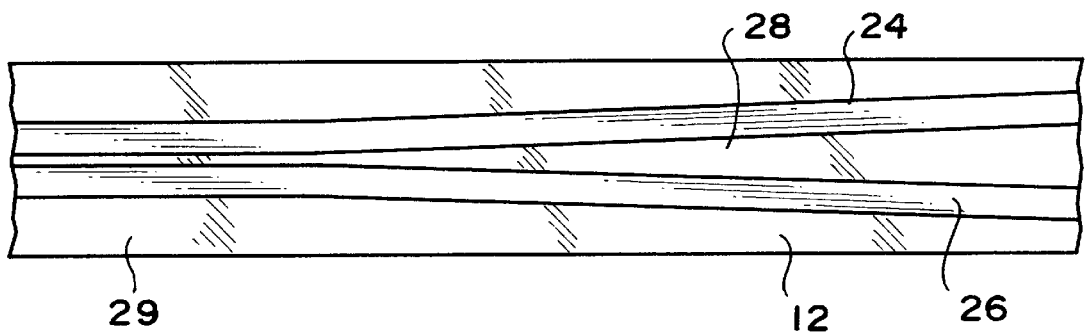
FIGS. 2A–2D are detailed illustrations of features that are can be incorporated into the leak detection tape with FIG. 2A showing the use of tapered conductors on the tape, FIGS. 2B and 2C showing the use of water soluble marks for leak location indication, and FIG. 2D showing the formation of a corner in the leak detection tape.

Other dimensions that are important include the width of each of the conductors 24 and 26, as well as the width of a gap 28 between the conductors 24 and 26. The width of the conductors 24 and 26 is important to insure that they are adequately conductive over extended lengths, since the thin vertical thickness will tend to reduce their conductance, and it is desirable to be able to use long continuous runs, e.g., 50 feet or more, of the tape 12 for monitoring large areas, such as a basement or roof. Accordingly, it is preferable that each of the conductors 24 and 26 be between ¼ and 1 inches wide. The width of the gap 28 is important to insure that the detection tape 12 is sufficiently sensitive to moisture that it can be used to detect even small water droplets, without being so sensitive that it will be prone to triggering false alarms in response to high humidity, etc. To achieve the desired sensitivity, it is therefore preferable that the gap 28 be between ¼ and 1.5 inches. It should be noted, however, that the gap 28 can be made to taper down (e.g., to ⅛ inch) at a first end 29 of the tape 12 as illustrated in FIG. 2A, to facilitate easier connection to leak detection devices having different terminal spacings.

Figure 2B:
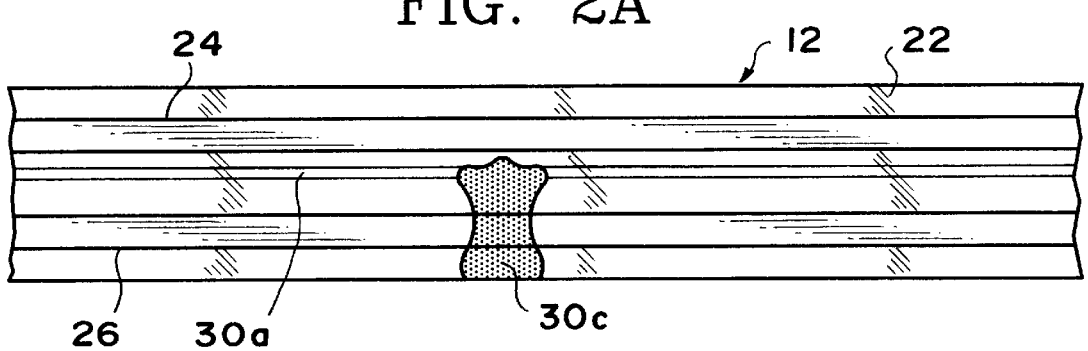
Figure 2C:
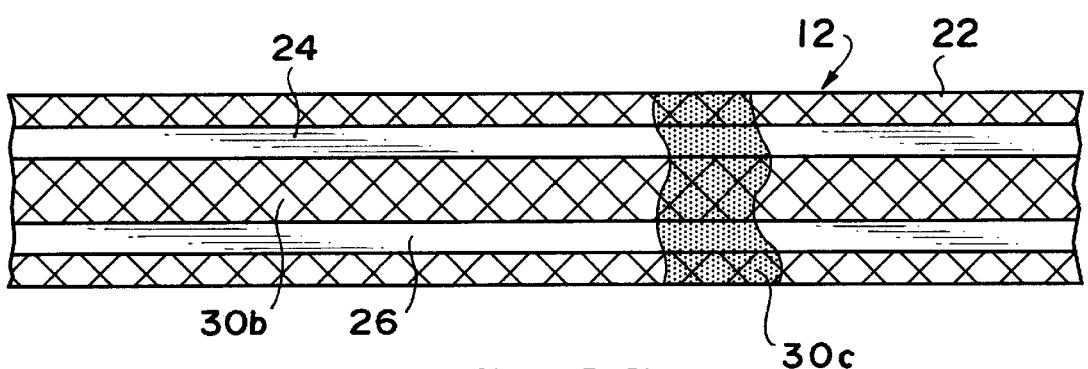

Another significant feature of the invention is the provision of moisture responsive visible indication means on the substrate 21 to provide an inexpensive means by which the location along the length of the tape 12, of liquid from a leak can be quickly determined by a visual inspection. This indication means can take any of several forms. For example, the substrate 21 can be treated with a chemical that changes color when exposed to water or moisture. Alternatively, as illustrated in FIGS. 2B and 2C, one or more lines 30a or a pattern 30b of water soluble marks can be placed along the length of the tape 12 on its top surface 22 which create a smear or run 30c when contacted by water. The material from which the substrate 21 is made can also be selected such that it naturally stains when contacted by water.

This feature of the invention, when combined with its other elements, results in the following significant advantages. First, the leak detection device 11 can be a simple, inexpensive short circuit detector, even if one or more long runs of the detection tape 12 are employed, for it is not necessary for the detection device 11 to be able to determine the location of a moisture induced short circuit along the length of the tape 12, since the indicating means provides this function. Thus, there is no need for the detection device 11 to employ TDR or similar techniques to locate a leak. (As an aside, It should be noted that this is not to say that the detection device cannot be of the TDR type, for the detection tape 12 can obviously be employed with any type of electrically based leak detection device.) Second, it is also not necessary to employ some type of event recording means in the detection device 11 for recording transient leak conditions, again, because the visible indicating means can serve this function as well. Third, use of the visible indicating means provides a convenient means by which multiple alarm triggering leaks can be easily identified.

With reference again to FIG. 1, the detection tape 12 preferably has an adhesive coating or backing material 31 formed on a bottom surface 32 thereof to enable the tape 12 to be secured to a surface to be monitored. To facilitate easy handling of the tape 12 prior to being used, it is also preferably packaged in rolled form. To prevent the adhesive coating from contacting and possibly contaminating the conductors 24 and 26 when the tape 12 is in a roll, a removable backing layer 34 is preferably attached to the bottom surface 32 on top of the adhesive coating 31.

Figure 3:
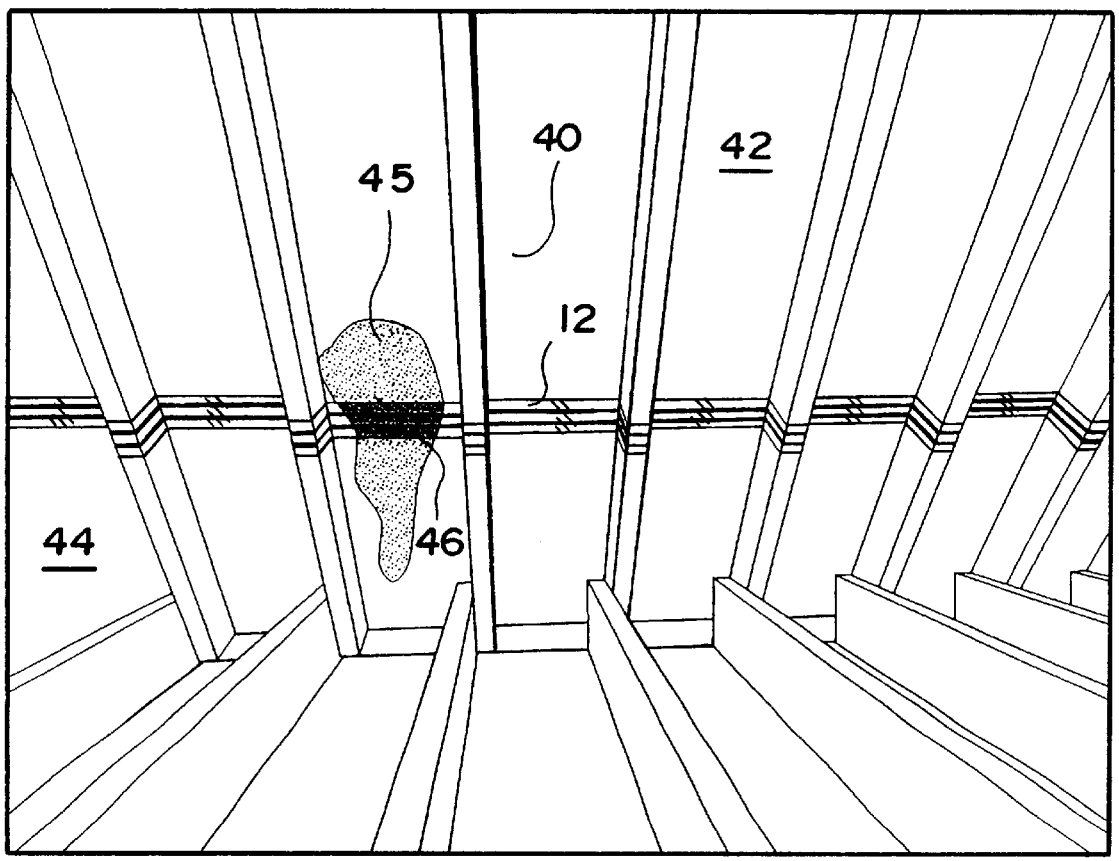
FIG. 3 is an illustration showing a first application of the leak detection tape for detecting roof leaks in the attic of a house or other building.
Figure 4:
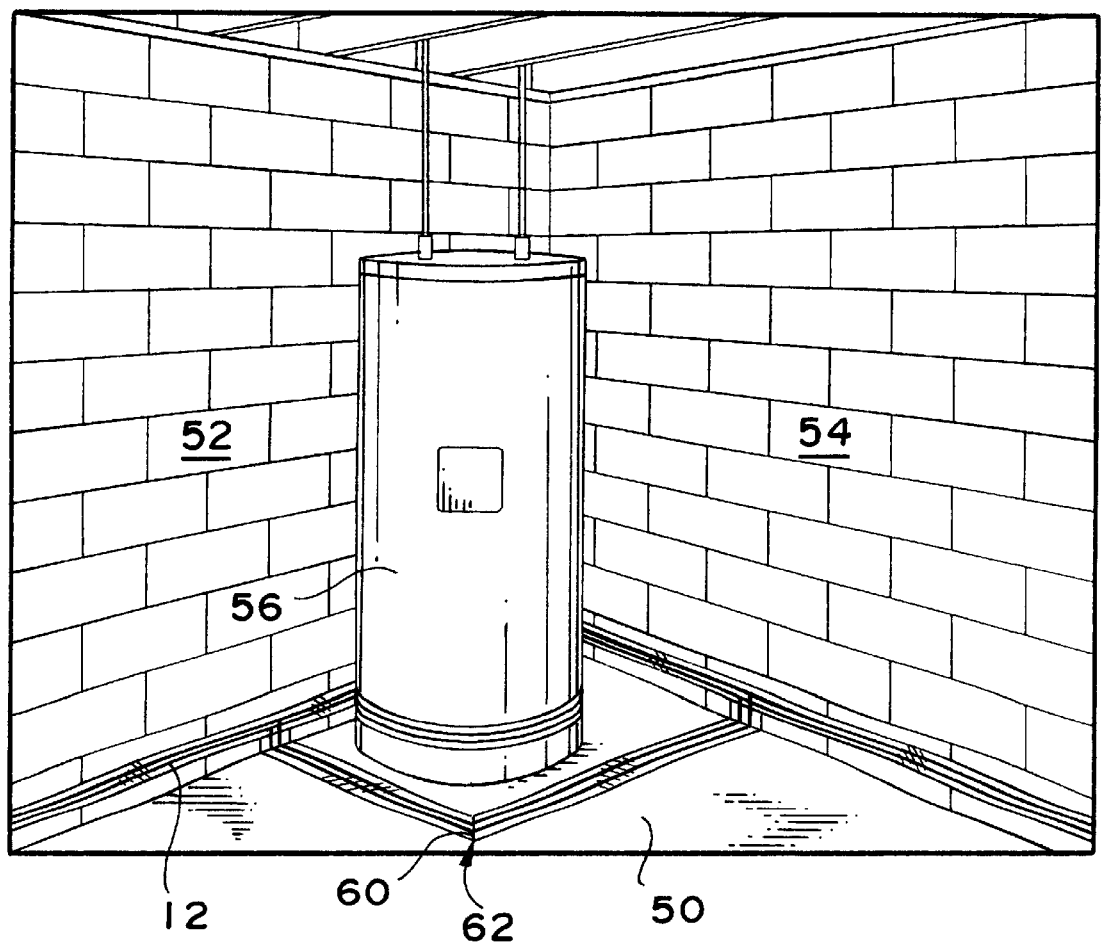
FIG. 4 is an illustration showing a second application of the leak detection tape for detecting leaks in a basement of a house or other building, and around a hot water heater disposed therein.

In use, the tape 12 is unwound, the backing layer 34 is removed and the tape 12 is secured along a surface to be monitored for water or other liquid leaks. FIGS. 3 and 4 illustrate two examples of the tape 12 in use. In FIG. 3, the tape 12 is secured along the inside surface 40 of a roof 42 in an attic 44 so that water leaking through the roof 42 as indicated at 45 may be detected through generation of a color change, stain, smear or run 46 on the tape 12.

Figure 2D:
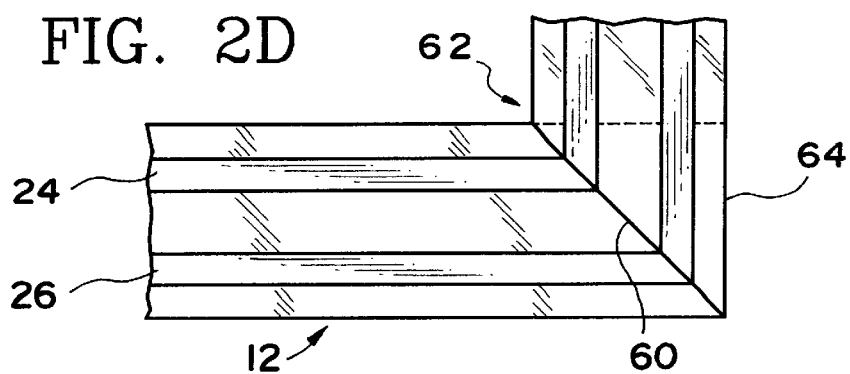

In FIG. 4, the tape 12 is shown secured 3 or 4 inches above a basement floor 50 on first and second basement walls 52 and 54, and a hot water heater 56. Such an arrangement is useful for detecting leaks from various types of plumbing fixtures, such as toilets, sinks, etc. In addition, another run of the tape 12 is shown that is placed on the a floor 50 around the hot water heater 56. In this instance, it is necessary to make a fold 60 in the tape 12 to form a corner 62. The fold 60 can then be folded down on top of the underlying layer of tape 12 if desired. It is important, however, that the fold be formed correctly to avoid short circuiting of conductors 24 and 26. To avoid this problem, the tape 12 should first be folded back on top of itself along a first fold line 64 as illustrated in FIG. 2D, and then the fold 60 should be formed at a 45 degree angle. Alternatively, insulating inserts may be employed in tape folds to avoid short circuiting.

Figure 5:
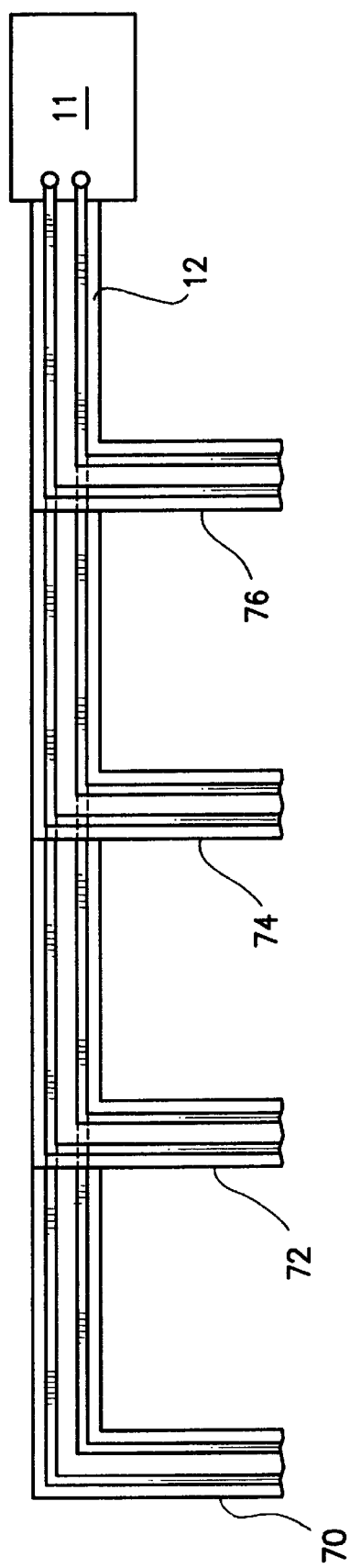
FIG. 5 is a schematic illustration showing how a plurality of runs of the leak detection tape can be connected in parallel for monitoring large areas with a single leak detector circuit.

FIG. 5 illustrates how a plurality of runs 70, 72, 74 and 76 of the leak detection tape 12 can be connected in parallel to allow a single one of the detection circuits or devices 11 to monitor one or more large areas. Although a single run of tape can monitor a fairly large area, at some point, the impedance losses along the length of the tape become too great for reliable operation. Using multiple runs of the tape connected in parallel eliminates this problem. The multiple runs of tape can be physically connected to one another using any suitable technique, such as tape, paper clips or other fasteners, in combination with the previously mentioned folding technique.

In each of these examples, the tape 12 is first secured in the area to be monitored. Now, if droplets of water flow transversely across the tape 12, thus either soaking the top surface 22 or bridging the gap 28, a conductive path will be formed between the two conductors 24 and 26, thereby substantially reducing the electrical resistance or impedance between the two. This condition will then be sensed by the leak detection device 11, and an audible and/or visual alarm will be generated. When this occurs, a person in the protected premises can then go to the location of the tape 12, and inspect its length for a visual indication, e.g., color change, stain, run or smear, that indicates the location(s) of the leak. Due to the sensitivity provided by the use of closely spaced, thin conductors, even a very few droplets of water can be detected by using the tape 12 in combination with the detection device 11. In this manner, potentially damaging water leaks can be detected long before substantial damage occurs.

In conclusion, the present invention provides an inexpensive, easy to use, reliable and highly sensitive device and method for the early detection of potentially damaging water leaks. The use of ultra-flat conductors enables the detection tape to responsive to even small droplets of water or other liquid, while the use of visual indicator means in combination with an electrically responsive detector elimi-nates the need for complex leak location detection circuitry, and allows a single detection device to be employed for monitoring large areas using one or more long runs of the detection tape connected to the single detection device. Finally, the use of a flexible tape or substrate with an adhesive securing layer makes for easy packaging and installation of the detection tape.

Although the invention has been disclosed in terms of a preferred embodiment, and variations thereon, it will be understood that numerous additional variations and modifications could be made thereto without departing from the scope of the invention as set forth in the following claims.

What is claimed is:

1. An elongated, flexible tape for use in detecting liquid leaks comprising:
   a) an elongated substrate formed from a flat, flexible, electrically insulating material, said substrate having a length, a top surface and a bottom surface, said bottom surface having an adhesive layer thereon;
   b) first and second spaced, parallel flat electrical conductors disposed on said top surface;
   and
   c) liquid responsive visual indicating means on said top surface of said substrate for indicating when liquid comes in contact with said top surface;
   whereby, liquid flowing across said first and second conductors can be detected by sensing a reduction in electrical impedance between said first and second conductors and providing an indication with a communication device, and a position along said length where liquid flows across said first and second conductors is indicated by said visual indicating means.

2. The tape of claim 1, wherein said liquid responsive visual indicating means comprises a chemical on said substrate which changes color when contacted by water.

3. The tape of claim 1, wherein said liquid responsive visual indicating means comprises a pattern of water soluble markings disposed along said length of said substrate on said top surface.

4. The tape of claim 1, wherein said liquid responsive visual indicating means comprises a material in said substrate which causes a stain to be formed on said top surface when contacted by water.

5. The tape of claim 1, wherein said first and second conductors each have a vertical thickness of no greater than 20 mils.

6. The tape of claim 5, wherein said first and second conductors are formed from conductive ink, conductive paint, graphite or thin strips of conductive foil.

7. The tape of claim 5, wherein said first and second conductors are formed on said top surface of said substrate by a material deposition process.

8. The tape of claim 5, wherein said substrate has a vertical thickness of no greater than 20 mils.

9. The tape of claim 1, wherein said first and second conductors are separated from one another by a gap having a width of between ¼ and 1.5 inches.

10. The tape of claim 1, wherein said substrate is formed from an absorbent material to enhance an ability of said tape to be able to detect droplets of liquid flowing across said top surface of said substrate between said first and second conductors.

11. The tape of claim 1, wherein said first and second conductors each has a width of between ¼ and 1 inches wide.

12. The tape of claim 1, further comprising an electrical leak detection device connected to said first and second conductors.

13. The tape of claim 12, wherein said leak detection device comprises an electrical resistance responsive device that senses a reduction in electrical resistance between said first and second conductors when water droplets flow across said top surface of said substrate, and contact said first and second conductors.

14. An elongated, flexible tape for use in detecting liquid leaks comprising:
   a) an elongated substrate formed from a flexible, electrically insulating material said substrate having a length, a top surface, a bottom surface and a minimal thickness, said bottom surface having an adhesive layer thereon;
   b) first and second parallel flat electrical conductors disposed on said top surface, and spaced apart from one another by a gap of between ¼ and 1.5 inches, each of said conductors having a vertical thickness no greater than 20 mils; and
   c) liquid responsive visual indicating means on said top surface of said substrate for indicating when liquid comes in contact with said top surface;
   whereby, liquid flowing across said first and second conductors can be detected by sensing a reduction in electrical impedance between said first and second conductors and providing an indication with a communication device, and a position along said length where liquid flows across said first and second conductors is indicated by said visual indicating means.

15. The tape of claim 14, further comprising an electrical leak detection device connected to said first and second conductors, said leak detection device comprising an electrical resistance responsive device that senses a reduction in electrical resistance between said first and second conductors when water droplets flow across said top surface of said substrate, and contact said first and second conductors.

16. The tape of claim 15, wherein said substrate is formed from an absorbent material having a thickness of no greater than 20 mils, and wherein said first and second conductors each has a width of between ¼ and 1 inches.

17. A method for early detection of water and other liquid leaks comprising the steps of:
   a) providing an elongated, flexible tape comprising:
      1) an elongated substrate formed from a flexible, electrically insulating material, said substrate having a length, a top surface, a bottom surface and a minimal thickness, said bottom surface having an adhesive layer thereon;
      2) first and second spaced, parallel flat electrical conductors disposed on said top surface; and
      3) liquid responsive visual indicating means on said top surface of said substrate for indicating when liquid comes in contact with said top surface;
   b) applying said tape with said adhesive layer to a surface in an area to be monitored for liquid leaks;
   c) electrically connecting an electrically operated leak detecting device to said first and second conductors an said tape;
   d) determining when a leaking liquid flows across said first and second conductors by detecting a reduction in electrical impedance between said first and second conductors with said detecting device and providing an indication with a communication device; and
   e) locating said detected leak by locating a position along said length of said tape where said liquid responsive visual indicating means has provided a visual indication that liquid has come into contact with said top surface of said tape.

18. The method of claim 17, further comprising the steps of:
   f) providing additional runs of said elongated flexible tape; and
   g) electrically connecting said additional runs in parallel;
   whereby, each of said additional runs may be used in combination with said leak detecting device to monitor one or more large areas.

19. The method of claim 18, wherein said first and second conductors each have a vertical thickness of no greater than 20 mils, and are separated from one another by a gap having a width of between ¼ and 1.5 inches.

20. The tape of claim 1, further comprising an electrical leak detection device connected to said first and second conductors, said leak detection device comprising an electrical resistance responsive device that senses a reduction in electrical resistance between said first and second conductors when water droplets flow across said top surface of said substrate, and contact said first and second conductors; and
   wherein said tape is arranged in a plurality of runs of said tape that are electrically connected in parallel with one another;
   whereby, each of said additional runs may be used in combination with said leak detecting device to monitor one or more large areas.

* * * * *